United States Patent
Guo et al.

(10) Patent No.: US 9,694,918 B1
(45) Date of Patent: Jul. 4, 2017

(54) METHOD FOR DISTURBANCE COMPENSATION BASED ON SLIDING MODE DISTURBANCE OBSERVER FOR SPACECRAFT WITH LARGE FLEXIBLE APPENDAGE

(71) Applicant: Beihang University, Beijing (CN)

(72) Inventors: Lei Guo, Beijing (CN); Yukai Zhu, Beijing (CN); Jianzhong Qiao, Beijing (CN); Peixi Zhang, Beijing (CN); Yuhan Xu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/371,549

(22) Filed: Dec. 7, 2016

(30) Foreign Application Priority Data

May 26, 2016 (CN) .......................... 2016 1 0361655

(51) Int. Cl.
| | | |
|---|---|---|
| *B64G 1/36* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B64G 1/24* | (2006.01) | |
| *G05D 1/08* | (2006.01) | |
| *G06F 17/16* | (2006.01) | |

(52) U.S. Cl.
CPC ............ *B64G 1/24* (2013.01); *G05D 1/0891* (2013.01); *G06F 17/16* (2013.01); *B64G 2001/245* (2013.01)

(58) Field of Classification Search
CPC ....................................................... B64G 1/24
See application file for complete search history.

(56) References Cited

U.S. PATENT DOCUMENTS

2008/0272240 A1* 11/2008 Goodzeit ................. B64G 1/38
244/172.7
2009/0132102 A1* 5/2009 Guyot ...................... B64G 1/24
701/3

FOREIGN PATENT DOCUMENTS

CN 101833337 A * 9/2010

* cited by examiner

*Primary Examiner* — Imran Mustafa
(74) *Attorney, Agent, or Firm* — Locke Lord LLP; Tim Tingkang Xia, Esq.

(57) ABSTRACT

The present invention provides a method for disturbance compensation based on a sliding mode disturbance observer for a spacecraft with a large flexible appendage, comprising steps of: a) building a spacecraft attitude control system; b) constructing an external system, the external system being incorporated with an uncertain portion of a damping matrix of a flexible appendage of the spacecraft; the external system being incorporated with an uncertain portion of a rigidity matrix of the flexible appendage of the spacecraft and describing a sum of flexible vibration and environmental disturbance; c) configuring a sliding mode disturbance observer for estimating the value of the sum of flexible vibration and environmental disturbance; d) compounding a nominal controller with the sliding mode disturbance observer in step c) to obtain a compound controller; the compound controller compensating for the sum of flexible vibration and environmental disturbance.

9 Claims, 2 Drawing Sheets

METHOD FOR DISTURBANCE COMPENSATION BASED ON SLIDING MODE DISTURBANCE OBSERVER FOR SPACECRAFT WITH LARGE FLEXIBLE APPENDAGE

CROSS-REFERENCE TO RELATED APPLICATIONS

This non-provisional application claims priority and benefit of, under 35 U.S.C. §119(a), Patent Application No. 201610361655.0 filed in P.R. China on May 26, 2016, the entire content of which is hereby incorporated by reference.

FIELD OF THE INVENTION

The present invention relates to the field of aerospace technology, and in particular, to a method for disturbance compensation based on a sliding mode disturbance observer for a spacecraft with a large flexible appendage.

BACKGROUND OF THE INVENTION

With the development of aerospace technology, the attitude control technology with high accuracy has become a critical technology for certain spacecrafts to realize their functions, for example, communication satellites, remote sensing satellites, space telescopes, etc. Therefore, the issue of high-accuracy attitude control of a spacecraft has become a hot and difficult point in researches recently. As for an inflexible satellite, its kinetic model is relatively simple, and the corresponding control method is relatively mature. However, in recent years, a flexible spacecraft, especially a spacecraft with a large appendage has become an important direction for the development of aerospace technology in the future, for example the ETS-VIII satellite in Japan. These large flexible satellites carry light flexible appendages such as large expandable antenna arrays and solar panels, and the kinetic model of the spacecraft becomes very complicated since it is a typical non-linear, multi-coupled distribution parameter system with infinite degree of freedom. This brings along a great challenge to the high-accuracy attitude control of the spacecraft. In addition, these large flexible appendages tend to produce elastic vibration and flexible appendages with large area increase the influence of environmental disturbances such as aerodynamic drag, solar radiation pressure and the like. These vibrations and external disturbances further increase the difficulty of attitude control of the spacecraft. Accordingly, am anti-disturbance control method with a high accuracy becomes a bottleneck technology for attitude control of a large flexible spacecraft.

As for the problem of attitude control of a flexible spacecraft, different control methods are also proposed in order to offset or restrain the influence of flexible vibration and external disturbance, and the typical ones include $H_\infty$ control, self-adaptation control, sliding mode variable structure control and so on. However, most of these control methods do not have typical disturbance offset ability, and thus cause the control accuracy to be limited. Based on the kinetic model of the system, flexible vibration and environmental disturbance can be described with referenced to the external system. However, due to the error of measurement and the difference between the space environment and ground environment, the damping and frequency parameters of the flexible appendage measured in the ground experiments always have a big uncertainty, which causes the external system for describing the disturbance to be a mathematical model with uncertain parameters. Internal mode control, active disturbance rejection control (ADRC) and disturbance observer-based control (DOBC) are relatively typical disturbance compensation methods. However, the traditional internal mode control has a high requirement on the disturbance model, and requires the disturbance model to be accurately known. ADRC estimates disturbance by way of an expansion state observer without the use of the intrinsic information of the disturbance itself, and thus has certain conservatism. DOBC makes full use of the information of disturbance, estimates and compensates for the disturbance that can be modeled in the disturbance system, and achieves an ideal effect, and it can also allow the disturbance model to have certain uncertainty. However, the rate of convergence of observation error of the traditional DOBC cannot be guaranteed, and gain scheduling is very complicated, while a sliding mode observer is superior in being not sensitive to parameter change and disturbance and has a high rate of convergence. Therefore, the advantages of the traditional DOBC and the sliding mode observer can be combined by using a sliding mode disturbance observer for estimating disturbance. In this way, the disturbance model is utilized, meanwhile this method has a strong robustness to the change of the disturbance model. Furthermore, gain scheduling is very easy, and it can be ensured that the observation error can be converged into a certain adjustable area rapidly, thereby improving the accuracy, robustness and rapidity of disturbance estimation.

Therefore, there is a need for a method for disturbance compensation based on a sliding mode disturbance observer for a spacecraft with a large flexible appendage that can efficiently estimate flexible vibration and environmental disturbance.

SUMMARY OF THE INVENTION

An objective of the present invention is to The present invention provides a sliding mode disturbance observer with high observation accuracy, strong robustness and easy gain scheduling, which solves the difficulty of accurate estimation and compensation for disturbance with uncertain parameters that can be modeled, and improves the control accuracy of the system.

According to one aspect of the present invention, a method for disturbance compensation based on a sliding mode disturbance observer for a spacecraft with a large flexible appendage is provided, comprising the following steps of:

a) building a spacecraft attitude control system $\Sigma_1$, the spacecraft attitude control system $\Sigma_1$ being incorporated with environmental disturbance and being converted into the spacecraft attitude control system $\Sigma_2$, and the spacecraft attitude control system $\Sigma_2$ being incorporated with a sum of flexible vibration and environmental disturbance;

b) constructing an external system $\Sigma_3$, the external system $\Sigma_3$ describing the sum of flexible vibration and environmental disturbance;

wherein, the external system $\Sigma_3$ is constructed through the following steps:

(1) incorporating an uncertain portion $C_A$ of a damping matrix C of the flexible appendage of the spacecraft, and incorporating an uncertain portion $D_A$ of a rigidity matrix D of the flexible appendage of the spacecraft; describing the damping matrix and rigidity matrix of the spacecraft as below:

$$\begin{cases} C = C_0 + C_\Delta \\ D = D_0 + D_\Delta \end{cases}$$

in which, $C_0$ and $D_0$ are respectively nominal parameters measured on the ground;

(2) defining state variables $w_1=\eta$, $w_2=\dot\eta$ and $w_3=d$, obtaining the following equation:

$$\begin{bmatrix} \dot w_1 \\ \dot w_2 \\ \dot w_3 \end{bmatrix} = \begin{bmatrix} 0 & I & 0 \\ -GD & -GC & -G\delta J^{-1} \\ 0 & 0 & 0 \end{bmatrix} \begin{bmatrix} w_1 \\ w_2 \\ w_3 \end{bmatrix} - \begin{bmatrix} 0 \\ G \\ 0 \end{bmatrix} [\delta J^{-1}(-\omega^x J\omega + u)] + \begin{bmatrix} 0 \\ 0 \\ \dot d \end{bmatrix}$$

in which, I is a unit matrix, and a matrix $G=(I-\delta J^{-1}\delta^T)^{-1}$;

(3) defining the following coefficient matrix:

$$W = \begin{bmatrix} 0 & I & 0 \\ -GD_0 & -GC_0 & -G\delta J^{-1} \\ 0 & 0 & 0 \end{bmatrix}, B = -\begin{bmatrix} 0 \\ G \\ 0 \end{bmatrix}\delta J^{-1}, \text{ and } V = [\delta^T D \ \delta^T C \ I];$$

(4) the external system $\Sigma_3$ being described as below:

$$\sum_3: \begin{cases} \dot w = (W + W_\Delta)w + B(-\omega^x J\omega + u) + \Gamma \\ \bar d = Vw \end{cases}$$

in which, $w=[w_1^T w_2^T w_3^T]^T$, $\Gamma$ is an uncertain vector, and $\Gamma$ is expressed as: $\Gamma=[0\ 0\ \dot d]^T$; $W_\Delta$ satisfies a bounded condition $W_\Delta=MF(t)N$, M and N are constant matrixes of a proper number of dimensions, F(t) is a time-varying matrix and satisfies $F^T(t)F(t)\leq I$; a state variable w satisfies a norm bounded condition $\|w\|\leq\alpha$, the sum $\bar d$ of flexible vibration and environmental disturbance satisfies a norm bounded condition $\|\bar d\|\leq\beta$, in which $\alpha$ and $\beta$ are known constants.

c) configuring a sliding mode disturbance observer for estimating the value of the sum of flexible vibration and environmental disturbance;

d) compounding a nominal controller with the sliding mode disturbance observer in step c) to obtain a compound controller;

the compound controller compensating for the sum of flexible vibration and environmental disturbance according to the estimated value of the sum of flexible vibration and environmental disturbance.

In certain aspects, the present invention relates to a spacecraft using the method as described above.

According to another aspect of the present invention, a spacecraft with a large flexible appendage based on a sliding mode disturbance observer is provided, which comprises a spacecraft shell, an external system module, a sliding mode disturbance observation module, a nominal control module, a compound control module, a central processing unit (CPU), a control unit and a spacecraft flexible wing plate and a spacecraft attitude control module, wherein, the spacecraft flexible wing plate is unfolded at two ends of the spacecraft shell;

the external system module is configured to describe the sum of flexible vibration and external environmental disturbance by the external system, and deliver the description result of the sum of flexible vibration and external environmental disturbance to the compound control module;

the sliding mode disturbance observation module is configured to estimate the sum of flexible vibration and external environmental disturbance by a sliding mode disturbance observer;

the nominal control module is configured to control a nominal controller to compound with the sliding mode disturbance observer in the sliding mode disturbance observation module;

the compound control module is configured to compensate for the sum of flexible vibration and external environmental disturbance according to the estimated value $\hat d$ of the sum $\bar d$ of flexible vibration and external environmental disturbance by a compound controller;

the spacecraft attitude control module is configured to incorporate the sum of flexible vibration and external environmental disturbance;

the central processing unit (CPU) reads the data of the compound control module 205, and processes the data; and the control unit executes the processing result of the central processing unit (CPU) and controls the attitude of the spacecraft.

It shall be appreciated that both the aforesaid general description and the following specific description are intended for illustrative description and explanation, and shall not be construed as for limiting the contents to be protected in the present invention.

BRIEF DESCRIPTION OF THE DRAWINGS

Further objectives, effects, and advantages of the present invention will become apparent from the following description of the embodiments of the present invention with reference to the accompanying drawings, wherein.

DETAILED DESCRIPTION OF THE INVENTION

Figure 1:
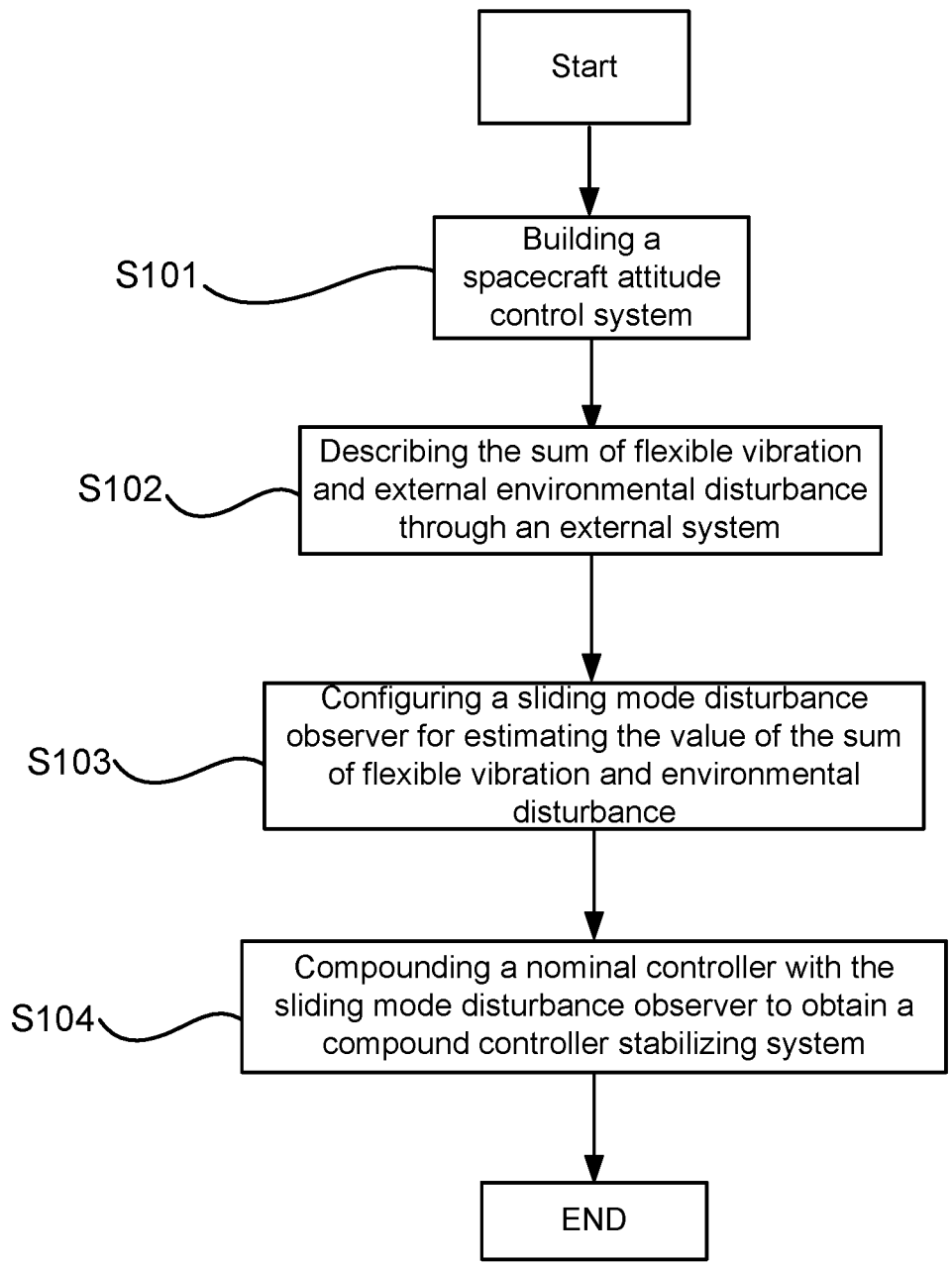
FIG. 1 illustrates a design flow chart of the method for disturbance compensation based on a sliding mode disturbance observer for a spacecraft with a large flexible appendage according to the present invention.

Objects and functions of the present invention as well as methods for realizing these objects and functions will be elucidated with reference to exemplary embodiments. However, the present invention is not limited to the following disclosed exemplary embodiments, but may be implemented in different ways. The description of the invention is merely provided to assist those of ordinary skill in the art in a comprehensive understanding of specific details of the invention in nature.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

Hereinafter, embodiments of the present invention will be described with reference to the drawings. In the drawings, like reference numerals designate like or similar parts or steps.

The present invention provides a method for disturbance compensation based on a sliding mode disturbance observer for a spacecraft with a large flexible appendage. As shown in FIG. 1, it is a design flow chart of the method for disturbance compensation based on a sliding mode disturbance observer for a spacecraft with a large flexible appendage according to the present invention. In the spacecraft disturbance method 100 of this embodiment, a spacecraft attitude control system is built, and an external system is constructed for describing the sum of flexible vibration and external environmental disturbance of the spacecraft. A sliding mode disturbance observer is configured for estimating the value of the sum of flexible vibration and external environmental disturbance, and the sliding mode disturbance observer is compounded with a nominal controller to compensate for the sum of flexible vibration and external environmental disturbance and stabilize the attitude control system.

Figure 2:
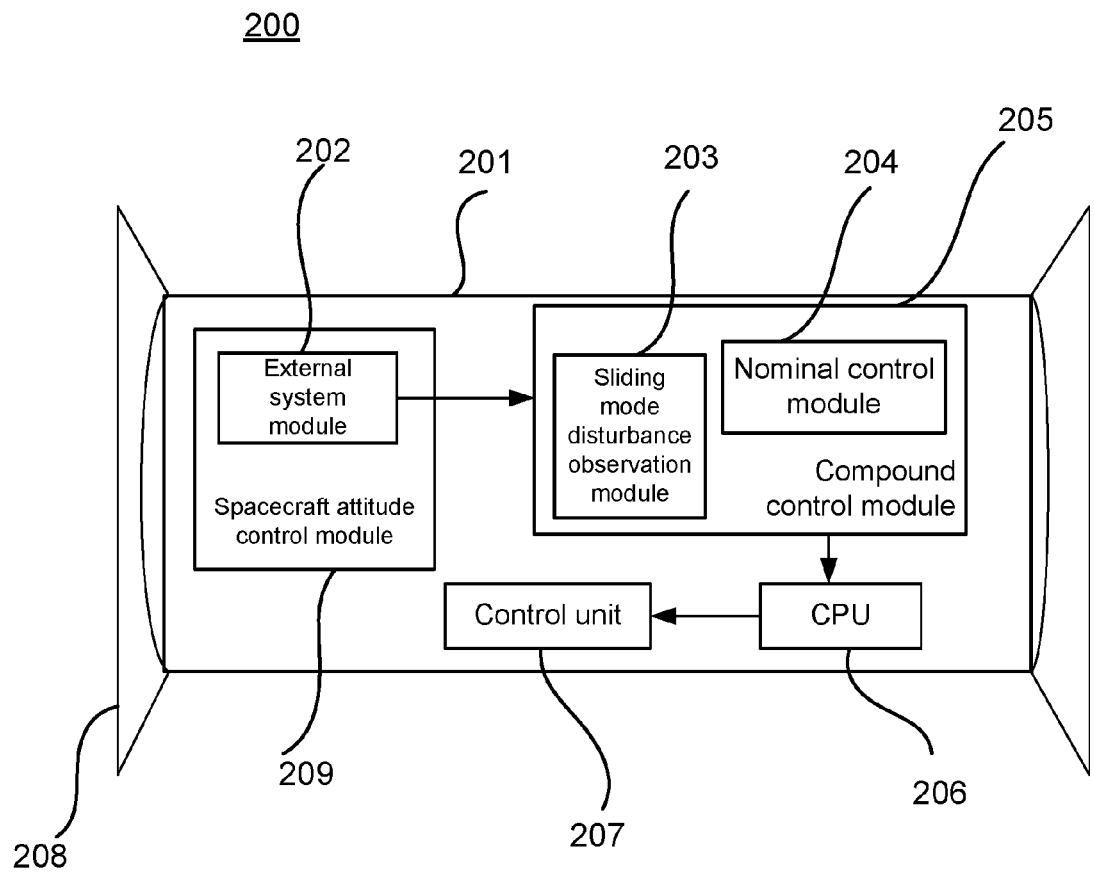
FIG. 2 shows a module block diagram of a spacecraft according to an embodiment of the present invention.

With the purpose of illustration, the method for disturbance compensation based on a sliding mode disturbance observer for a spacecraft with a large flexible appendage provided by the present invention is implemented through different modules. As shown in FIG. 2, it is a module block diagram of the spacecraft with a large flexible appendage based on a sliding mode disturbance observer according to an embodiment of the present invention. Specifically, the spacecraft comprises a spacecraft shell 201, an external system module 202, a sliding mode disturbance observation module 203, a nominal control module 204, a compound control module 205, a central processing unit (CPU) 206, a control unit 207, a spacecraft flexible wing plate 208 and a spacecraft attitude control module 209.

As shown in FIG. 2, the sliding mode disturbance observation module 203, the nominal control module 204, the compound control module 205, the central processing unit (CPU) 206, the control unit 207, the external system module 202 and the spacecraft attitude control module 209 are mounted inside the spacecraft shell 201. The spacecraft flexible wing plate 208 is unfolded at two ends of the spacecraft shell 201.

The external system module 202 is configured to describe the sum of flexible vibration and external environmental disturbance by the external system. The external system module 202 delivers the description result of the sum of flexible vibration and external environmental disturbance to the compound control module 205.

The sliding mode disturbance observation module 203 is configured to estimate the sum of flexible vibration and external environmental disturbance by a sliding mode disturbance observer.

The nominal control module 204 is configured to control a nominal controller to compound with the sliding mode disturbance observer in the sliding mode disturbance observation module 203.

The compound control module 205 is configured to compensate for the sum of flexible vibration and external environmental disturbance according to the estimated value $\hat{\bar{d}}$ of the sum $\bar{d}$ of flexible vibration and external environmental disturbance by a compound controller.

The spacecraft attitude control module 209 is configured to incorporate the sum of flexible vibration and external environmental disturbance.

The central processing unit (CPU) 206 reads the data of the compound control module 205, and processes the data.

The control unit 207 executes the processing result of the central processing unit (CPU) 206 and controls the attitude of the spacecraft. Specifically, the control unit 207 compensates for the sum of flexible vibration and external environmental disturbance according to the estimated value $\hat{\bar{d}}$ of the sum $\bar{d}$ of flexible vibration and external environmental disturbance through the compound control module 205, thereby adjusting the attitude of the spacecraft. The method for disturbance compensation based on a sliding mode disturbance observer for a spacecraft with a large flexible appendage will be described in detail with reference to FIG. 1. The specific steps are as follows:

In step S101, building a spacecraft attitude control system, and the sum of flexible vibration and external environmental disturbance is incorporated into the spacecraft attitude control system.

An external environmental disturbance is incorporated, and a spacecraft attitude control system $\Sigma_1$ is built. It is expressed as:

$$\sum\nolimits_1 : \begin{cases} J\dot{\omega} + \delta^T \ddot{\eta} = -\omega^x J\omega + u + d \\ \ddot{\eta} + C\dot{\eta} + D\eta + \delta\dot{\omega} = 0 \end{cases}$$

in which, J is an inertia matrix of the flexible spacecraft, $\omega$ is an absolute angular velocity of the flexible spacecraft, $\omega^x$ indicates a cross product matrix, $\dot{\omega}$ is a derivative of the absolute angular velocity $\omega$ of the flexible spacecraft, $\delta$ is a rigid-flexible coupling matrix, $\eta$ is a modal coordinate, $\ddot{\eta}$ is a second-order derivative of the modal coordinate $\eta$; u is control input, d is environmental disturbance, C is the damping matrix of the flexible appendage, and is expressed as: $C=\text{diag}\{2\xi_i\omega_{ni}, i=1, 2, \ldots, n\}\in R^{n\times n}$; D is the rigidity matrix of the flexible appendage, and is expressed as: $D=\text{diag}\{\omega_{ni}^2, i=1, 2, \ldots, n\}\in R^{n\times n}$, in which $\xi_i$ is a damping coefficient, $\omega_{ni}$ is a natural frequency, and n is modal number.

A spacecraft attitude control system $\Sigma_1$ is converted into a spacecraft attitude control system $\Sigma_2$ through a mathematical conversion. The spacecraft attitude control system $\Sigma_2$ is incorporated into the sum of flexible vibration and environmental disturbance. The spacecraft attitude control system $\Sigma_2$ is expresses as: $\Sigma_2: J_0\dot{\omega}=-\omega^x J\omega+u+\bar{d}$, in which, a coefficient matrix $J_0=J-\delta^T\delta$, and the sum $\bar{d}$ of flexible vibration and external environmental disturbance is expresses as: $\bar{d}=\delta^T(C\dot{\eta}+D\eta)+d$.

In step S102, describe the sum of flexible vibration and external environmental disturbance by constructing an external system $\Sigma_3$.

Firstly, an uncertain portion $C_\Delta$ of a damping matrix C of the flexible appendage of the spacecraft is incorporated, and an uncertain portion $D_\Delta$ of a rigidity matrix D of the flexible appendage of the spacecraft is incorporated; the damping matrix and rigidity matrix of the spacecraft are described as below:

$$\begin{cases} C = C_0 + C_\Delta \\ D = D_0 + D_\Delta \end{cases}$$

in which, $C_0$ and $D_0$ are respectively nominal parameters measured on the ground.

Secondly, state variables $w_1=\eta$, $w_2=\dot{\eta}$ and $w_3=d$ are defined, obtaining the following equation:

$$\begin{bmatrix} \dot{w}_1 \\ \dot{w}_2 \\ \dot{w}_3 \end{bmatrix} = \begin{bmatrix} 0 & I & 0 \\ -GD & -GC & -G\delta J^{-1} \\ 0 & 0 & 0 \end{bmatrix} \begin{bmatrix} w_1 \\ w_2 \\ w_3 \end{bmatrix} - \begin{bmatrix} 0 \\ G \\ 0 \end{bmatrix} \delta J^{-1}(-\omega^x J\omega + u) + \begin{bmatrix} 0 \\ 0 \\ \dot{d} \end{bmatrix}$$

in which, I is a unit matrix, and a matrix $G=(I-\delta J^{-1}\delta^T)^{-1}$; a coefficient matrix is defined:

$$W = \begin{bmatrix} 0 & I & 0 \\ -GD_0 & -GC_0 & -G\delta J^{-1} \\ 0 & 0 & 0 \end{bmatrix}, B = -\begin{bmatrix} 0 \\ G \\ 0 \end{bmatrix} \delta J^{-1}, \text{ and } V = [\delta^T D \ \delta^T C \ I].$$

Finally, an external system $\Sigma_3$ is constructed and is described as below:

$$\sum\nolimits_3 : \begin{cases} \dot{w} = (W + W_\Delta)w + B(-\omega^x J\omega + u) + \Gamma \\ \overline{d} = Vw \end{cases}$$

in which, $w=[w_1^T w_2^T w_3^T]^T$, $\Gamma$ is an uncertain vector, and $\Gamma$ is expressed as: $\Gamma=[0\ 0\ \dot{d}]^T$; $W_\Delta$ satisfies a bounded condition $W_\Delta=MF(t)N$, M and N are constant matrixes of a proper number of dimensions, F(t) is a time-varying matrix and satisfies $F^T(t)F(t)\leq I$; a state variable w satisfies a norm bounded condition $\|w\|\leq\alpha$, the sum $\overline{d}$ of flexible vibration and environmental disturbance satisfies a norm bounded condition $\|\overline{d}\|\leq\beta$, in which $\alpha$ and $\beta$ are known constants.

In step S103, configuring a sliding mode disturbance observer for estimating the value of the sum of flexible vibration and environmental disturbance.

The sum of flexible vibration and external environmental disturbance is incorporated into the spacecraft attitude control system built in step S101, and it needs to estimate the value of the sum of flexible vibration and external environmental disturbance. In the embodiment of the present invention, specifically, a sliding mode disturbance observer is used to estimate the sum of flexible vibration and external environmental disturbance.

The steps for configuring the sliding mode disturbance observer are as follows:

(1) constructing an auxiliary system $\Sigma_4$, which is expressed as: $J_0\dot{\hat{\omega}}=-\omega^x J_0\omega+u+v$, in which $\hat{\omega}$ is a state variable of the auxiliary system, and v is a sliding mode term;

(2) making the sliding mode term $$v = k\frac{\tilde{\omega}}{\|\tilde{\omega}\|},$$

in which, $\tilde{\omega}=\omega-\hat{\omega}$, $k>\beta$ is a given constant, and converting the auxiliary system $\Sigma_4$ to a system $\Sigma_5$, which is expressed as: $J_0\dot{\tilde{\omega}}=\overline{d}-v$;

(3) constructing a Lyapunov function $V_1=\tilde{\omega}^T J_0\tilde{\omega}$ for the system $\Sigma_5$, and taking derivative for the Lyapunov function $V_1$, obtaining the following relationship:

$$\dot{V}_1 \leq -2\frac{(k-\beta)}{\sqrt{\lambda_{max}(J_0)}}V_1^{\frac{1}{2}},$$

in which, $\lambda_{max}(J_0)$ is the maximum eigenvalue of $J_0$; then $\tilde{\omega}$ is converged to zero within a limited time of $t_r$, the sliding mode term v is equivalent to $\overline{d}$, wherein $$t_r = \frac{\sqrt{\lambda_{max}(J_0)}V_1^{\frac{1}{2}}(0)}{k-\beta},$$

$V_1(0)$ is an initial value of the Lyapunov function $V_1$.

(4) configuring a sliding mode disturbance observer $\Sigma_6$, which is expressed as:

$$\sum\nolimits_6 : \begin{cases} \hat{\overline{d}} = V\hat{w}, \hat{w} = \xi + LJ_0\omega \\ \dot{\xi} = (W-LV)\hat{w} + (B-L)(-\omega^x J\omega + u) + \gamma P^{-1}V^T\text{sign}(v) \end{cases}$$

in which, $\hat{\overline{d}}$ is the estimated value of the sum $\overline{d}$ of flexible vibration and environmental disturbance, $\hat{w}$ is an estimated value of the state variable w, $\xi$ is an auxiliary state variable, L is an observer gain to be determined, $\gamma>0$ is an adjustable constant, P>0 is a positive definite symmetric matrix to be solved, sign(·) is a sign function, and for a n-dimensional vector, $$x = [x_1 \ ... \ x_n]^T,$$

the sign function sign(·) satisfies $$\text{sign}(x) = [\text{sign}(x_1) \ ... \ \text{sign}(x_n)]^T.$$

In the present embodiment, the observer gain L to be determined and the positive definite symmetric matrix P to be solved are solved by way of an inequality as below:

The positive definite symmetric matrix P and a matrix $P_L$ satisfy the following linear matrix inequality:

$$\begin{bmatrix} (PW - P_LV) + (PW - P_LV)^T & PM & P \\ * & -\mu_1 I & 0 \\ * & * & -\mu_2 I \end{bmatrix} < 0$$

in which, $\mu_1>0$, $\mu_2>0$ are given constants, I is a unit matrix with a proper number of dimensions, the symbol "*" represents a symmetrical portion of a symmetrical matrix, and the gain matrix is selected to be $L=P^{-1}P_L$. The sliding mode disturbance observer constructed in this embodiment observes that an error $e_w$ asymptotically converges into an adjustable area $\Omega$ near a balance point, and the adjustable area $\Omega$, which is expressed as:

$$\Omega = \left\{ e_w \in R^{2n} \middle| \|Ve_w\| \leq \frac{\mu_1\alpha\|N\|^2 + \mu_2\|\Gamma\|^2}{2\gamma} \right\}.$$

A gain array of linear feedback is easily solved using the above linear matrix inequality in this embodiment. A sliding mode term parameter is selected according to accuracy and rate requirement. Through the selection of the sliding mode term parameter, the observation error is converged into an adjustable area including an original point, thereby improving the estimation accuracy of the observer.

In step S104, compounding a nominal controller with the sliding mode disturbance observer to obtain a compound controller stabilizing system for compensating for the sum of flexible vibration and environmental disturbance.

In the embodiment of the present invention, the sum of flexible vibration and environmental disturbance is incorporated into a spacecraft attitude control system, and the value of the sum is estimated through a configured disturbance observer. In the embodiment, the spacecraft attitude control system needs to compensate for the estimated value of the sum of flexible vibration and environmental disturbance, thus ensuring the precise control of the spacecraft attitude. A compound controller is used to compensate for the sum of flexible vibration and environmental disturbance in the present invention.

The nominal controller is compounded with the sliding mode disturbance observer configured in step S103 to obtain a compound controller for stabilizing the system. The compound controller stabilizing system is specifically expressed as: $u=u_n-\hat{d}$, in which $u_n$ is the nominal controller used for stabilizing a nominal system without flexible vibration or environmental disturbance, and $\hat{d}$ is a value of the sum $\bar{d}$ of flexible vibration and environmental disturbance estimated by the sliding mode disturbance observer. In the compound controller stabilizing system, the control input u is subtracted by the estimated value $\hat{d}$ of the sum $\bar{d}$ of flexible vibration and environmental disturbance estimated by the sliding mode disturbance observer on the basis of the nominal controller $u_n$, thereby allowing the compound controller to compensate for the sum $\bar{d}$ of flexible vibration and environmental disturbance with the estimated value $\hat{d}$ of the sum of flexible vibration and environmental disturbance.

In certain aspects, the present invention relates to a spacecraft using the method as described above.

By combining the description and practice of the present invention disclose herein, other embodiments of the present invention are also easy to conceive and understand for a person skilled in the art. The description and embodiments are only illustrative, and the real scope and essence of the present invention shall be defined by the claims.

According to the present invention, a sliding mode disturbance observer with high observation accuracy, strong robustness and easy gain scheduling is provided, which solves the difficulty of accurate estimation and compensation for disturbance with uncertain parameters that can be modeled, and improves the control accuracy of the system.

Based on the description and practice of the present invention as disclosed herein, other embodiments of the present invention are readily conceived of and understood to those skilled in the art. The description and embodiments are provided for exemplary purpose only, the real scope and spirit of the present invention are defined by the claims.

Other embodiments will be conceivable and understood by those skilled in the art upon consideration of this description or from practice of the invention disclosed herein. The description and embodiments are merely exemplary, and the true scope and spirit are intended to be defined by the claims.

What is claimed is:

1. A method for disturbance compensation based on a sliding mode disturbance observer for a spacecraft with a large flexible appendage, comprising the following steps of:
   a) building a spacecraft attitude control system $\Sigma_1$, the spacecraft attitude control system $\Sigma_1$ being incorporated with environmental disturbance and being converted into the spacecraft attitude control system $\Sigma_2$, and the spacecraft attitude control system $\Sigma_2$ being incorporated with a sum of flexible vibration and environmental disturbance;
   b) constructing an external system $\Sigma_3$, the external system $\Sigma_3$ describing the sum of flexible vibration and environmental disturbance;
   wherein, the external system $\Sigma_3$ is constructed through the following steps:
   (1) incorporating an uncertain portion $C_\Delta$ of a damping matrix C of the flexible appendage of the spacecraft, and incorporating an uncertain portion $D_\Delta$ of a rigidity matrix D of the flexible appendage of the spacecraft; describing the damping matrix and rigidity matrix of the spacecraft as below:

$$\begin{cases} C = C_0 + C_\Delta \\ D = D_0 + D_\Delta \end{cases}$$

in which, $C_0$ and $D_0$ are respectively nominal parameters measured on the ground;
   (2) defining state variables $w_1=\eta$, $w_2=\dot{\eta}$ and $w_3=d$, obtaining the following equation:

$$\begin{bmatrix} \dot{w}_1 \\ \dot{w}_2 \\ \dot{w}_3 \end{bmatrix} = \begin{bmatrix} 0 & I & 0 \\ -GD & -GC & -G\delta J^{-1} \\ 0 & 0 & 0 \end{bmatrix} \begin{bmatrix} w_1 \\ w_2 \\ w_3 \end{bmatrix} - \begin{bmatrix} 0 \\ G \\ 0 \end{bmatrix} \delta J^{-1}(-\omega^x J\omega + u) + \begin{bmatrix} 0 \\ 0 \\ \dot{d} \end{bmatrix}$$

in which, I is a unit matrix, and a matrix $G=(I-\delta J^{-1}\delta^T)^{-1}$;
   (3) defining the following coefficient matrix:

$$W = \begin{bmatrix} 0 & I & 0 \\ -GD_0 & -GC_0 & -G\delta J^{-1} \\ 0 & 0 & 0 \end{bmatrix}, B = -\begin{bmatrix} 0 \\ G \\ 0 \end{bmatrix} \delta J^{-1}, \text{ and}$$

$$V = [\delta^T D \ \delta^T C \ I];$$

(4) the external system $\Sigma_3$ being described as below:

$$\sum_3 : \begin{cases} \dot{w} = (W + W_\Delta)w + B(-\omega^x J\omega + u) + \Gamma \\ \bar{d} = Vw \end{cases}$$

in which, $w=[w_1^T \ w_2^T \ w_3^T]^T$, $\Gamma$ is an uncertain vector, and $\Gamma$ is expressed as: $\Gamma=[0 \ 0 \ \dot{d}]^T$; $W_\Delta$ satisfies a bounded condition $W_\Delta = MF(t)N$, M and N are constant matrixes of a proper number of dimensions, F(t) is a time-varying matrix and satisfies $F^T(t)F(t) \leq I$; a state variable w satisfies a norm bounded condition $\|w\| \leq \alpha$, the sum $\bar{d}$ of flexible vibration and environmental disturbance satisfies a norm bounded condition $\|\bar{d}\| \leq \beta$, in which $\alpha$ and $\beta$ are known constants;
   c) configuring a sliding mode disturbance observer for estimating the value of the sum of flexible vibration and environmental disturbance;
   d) compounding a nominal controller with the sliding mode disturbance observer in step c) to obtain a compound controller;
   the compound controller compensating for the sum of flexible vibration and environmental disturbance according to the estimated value of the sum of flexible vibration and environmental disturbance.

2. The method according to claim 1, wherein the spacecraft attitude control system $\Sigma_1$ is expressed as:

$$\sum\nolimits_1 : \begin{cases} J\dot{\omega} + \delta^T \ddot{\eta} = -\omega^x J\omega + u + d \\ \ddot{\eta} + C\dot{\eta} + D\eta + \delta\dot{\omega} = 0 \end{cases}$$

in which, J is an inertia matrix of the flexible spacecraft, $\omega$ is an absolute angular velocity of the flexible spacecraft, $\omega^x$ indicates a cross product matrix, $\dot{\omega}$ is a derivative of the absolute angular velocity $\omega$ of the flexible spacecraft, $\delta$ is a rigid-flexible coupling matrix, $\eta$ is a modal coordinate, $\ddot{\eta}$ is a second-order derivative of the modal coordinate $\eta$; u is control input, d is environmental disturbance, C is the damping matrix of the flexible appendage, and D is the rigidity matrix of the flexible appendage.

3. The method according to claim 2, wherein the damping matrix C of the flexible appendage is expressed as: C=diag$\{2\xi_i\omega_{ni}, i=1, 2, \ldots, n\} \in R^{n \times n}$, and the rigidity matrix D of the flexible appendage is expressed as: D=diag$\{\omega_{ni}^2, i=1, 2, \ldots, n\} \in R^{n \times n}$, in which is a damping coefficient, $\omega_{ni}$ is a natural frequency, and n is modal number.

4. The method according to claim 2, wherein the system $\Sigma_2$ is expressed as:

$\Sigma_2: J_0\dot{\omega} = -\omega^x J\omega + u + \bar{d}$ in which, a coefficient matrix $J_0 = J - \delta^T \delta$, and the sum $\bar{d}$ of flexible vibration and environmental disturbance is expressed as $\bar{d} = \delta^T(C\dot{\eta} + D\eta) + d$.

5. The method according to claim 1, wherein the steps for configuring the sliding mode disturbance observer are as follows:

(1) constructing an auxiliary system $\Sigma_4$, which is expressed as: $J_0 \dot{\hat{\omega}} = -\omega^x + u + v$, in which $\hat{\omega}$ is a state variable of the auxiliary system, and v is a sliding mode term;

(2) making the sliding mode term $$v = k \frac{\tilde{\omega}}{\|\tilde{\omega}\|},$$

in which, $\tilde{\omega} = \omega - \hat{\omega}$, k>$\beta$ is a given constant, and converting the auxiliary system $\Sigma_4$ to a system $\Sigma_5$, which is expressed as: $J_0 \dot{\tilde{\omega}} = \bar{d} - v$;

(3) constructing a Lyapunov function $V_1 = \tilde{\omega}^T J_0 \tilde{\omega}$ for the system $\Sigma_5$, and taking derivative for the Lyapunov function $V_1$, obtaining the following relationship:

$$\dot{V}_1 \leq -2 \frac{(k-\beta)}{\sqrt{\lambda_{max}(J_0)}} V_1^{\frac{1}{2}},$$

in which, $\lambda_{max}(J_0)$ is the maximum eigenvalue of $J_0$;

(4) configuring a sliding mode disturbance observer $\Sigma_6$, which is expressed as:

$$\sum\nolimits_6 : \begin{cases} \hat{\bar{d}} = V\hat{w}, \hat{w} = \xi + LJ_0\omega \\ \dot{\xi} = (W - LV)\hat{w} + (B - L)(-\omega^x J\omega + u) + \gamma P^{-1} V^T \text{sign}(v) \end{cases}$$

in which, $\hat{\bar{d}}$ is the estimated value of the sum $\bar{d}$ of flexible vibration and environmental disturbance, $\hat{w}$ is an estimated value of the state variable w, $\xi$ is an auxiliary state variable, L is an observer gain to be determined, $\gamma$>0 is an adjustable constant, P>0 is a positive definite symmetric matrix to be solved, sign($\cdot$) is a sign function, and for a n-dimensional vector, $x = [x_1 \ldots x_n]^T,$ the sign function sign($\cdot$) satisfies $\text{sign}(x) = [\text{sign}(x_1) \ldots \text{sign}(x_n)]^T.$ 6. The compensation method according to claim 5, wherein in the step (3), $\tilde{\omega}$ is converged to zero within a limited time of $t_r$, the sliding mode term v is equivalent to $\bar{d}$, wherein $$t_r = \frac{\sqrt{\lambda_{max}(J_0)} V_1^{\frac{1}{2}}(0)}{k - \beta},$$

$V_1(0)$ is an initial value of the Lyapunov function $V_1$.

7. The compensation method according to claim 1, wherein, the sliding mode disturbance observer observes that an error $e_w$ asymptotically converges into an adjustable area $\Omega$ near a balance point, and the adjustable area $\Omega$ is expressed as:

$$\Omega = \left\{ e_w \in R^{2n} \Big| \|Ve_w\| \leq \frac{\mu_1 \alpha \|N\|^2 + \mu_2 \|\Gamma\|^2}{2\gamma} \right\},$$

wherein, $\mu_1$>0, $\mu_2$>0 are given constants.

8. The compensation method according to claim 5, wherein, the observer gain L to be determined and the positive definite symmetric matrix P to be solved are solved as below:

the positive definite symmetric matrix P and a matrix $P_L$ satisfy the following linear matrix inequality:

$$\begin{bmatrix} (PW - P_L V) + (PW - P_L V)^T & PM & P \\ * & -\mu_1 I & 0 \\ * & * & -\mu_2 I \end{bmatrix} < 0$$

in which, $\mu_1$>0, $\mu_2$>0 are given constants, I is a unit matrix with a proper number of dimensions, the symbol "*" represents a symmetrical portion of a symmetrical matrix, and the gain matrix is selected to be $L = P^{-1} P_L$.

9. The compensation method according to claim 1, wherein, the compound controller is expressed as: $u = u_n - \hat{\bar{d}}$, $u_n$ is the nominal controller used for stabilizing a nominal system without flexible vibration or environmental disturbance, and $\hat{\bar{d}}$ is a value of the sum $\bar{d}$ of flexible vibration and environmental disturbance estimated by the sliding mode disturbance observer.

* * * * *